US006756547B2

(12) United States Patent
Lefler

(10) Patent No.: US 6,756,547 B2
(45) Date of Patent: Jun. 29, 2004

(54) METHOD AND APPARATUS FOR LOADING AND UNLOADING EQUIPMENT

(76) Inventor: Howard Lefler, Industrial Equipment Service 2206 E. Southgate Service, Enid, OK (US) 73702

( * ) Notice: Subject to any disclaimer, the term of this patent is extended or adjusted under 35 U.S.C. 154(b) by 227 days.

(21) Appl. No.: 10/061,538

(22) Filed: Jan. 30, 2002

(65) Prior Publication Data

US 2002/0102151 A1 Aug. 1, 2002

Related U.S. Application Data

(60) Provisional application No. 60/265,254, filed on Jan. 31, 2001.

(51) Int. Cl.[7] ........................ G01G 19/10; G01G 19/16; G01G 23/01; B66F 7/26; B60S 9/02

(52) U.S. Cl. ........................ 177/141; 177/146; 73/1.13; 254/45; 254/418; 254/DIG. 4

(58) Field of Search .......................... 177/50, 141, 146; 73/1.13; 254/45, 418, DIG. 4

(56) References Cited

U.S. PATENT DOCUMENTS

| | | | | | |
|---|---|---|---|---|---|
| 2,487,508 | A | | 11/1949 | Anderson | 254/2 R |
| 2,490,668 | A | * | 12/1949 | Burgett | 254/418 |
| 2,909,367 | A | | 10/1959 | Goehrig, Jr. et al. | 177/146 |
| 3,080,835 | A | | 3/1963 | Guglielmi | 108/116 |
| 3,291,234 | A | | 12/1966 | Woodburn | 177/136 |
| 3,409,272 | A | * | 11/1968 | Rasmussen | 254/45 |
| 3,431,992 | A | | 3/1969 | Whitecar | 177/140 |
| 3,456,749 | A | | 7/1969 | Smieja | 177/146 |
| 3,753,550 | A | * | 8/1973 | Criswell | 254/133 R |
| 3,758,077 | A | * | 9/1973 | Fisher | 254/133 R |
| 4,137,977 | A | * | 2/1979 | Alger | 177/146 |
| 4,206,906 | A | * | 6/1980 | Eubank | 254/89 H |
| 4,479,560 | A | * | 10/1984 | Day | 177/147 |
| 4,569,531 | A | * | 2/1986 | Beadle | 280/30 |
| 4,651,838 | A | * | 3/1987 | Hamilton et al. | 177/209 |
| 4,708,319 | A | * | 11/1987 | Cruz | 254/45 |
| 4,722,407 | A | * | 2/1988 | Gindy et al. | 177/50 |
| 4,792,004 | A | * | 12/1988 | Sheffield | 177/141 |
| 4,903,946 | A | * | 2/1990 | Stark | 254/45 |
| 5,178,226 | A | * | 1/1993 | Bowman et al. | 177/139 |
| 5,285,020 | A | * | 2/1994 | Jurca | 177/141 |
| 5,437,236 | A | | 8/1995 | Zeiner | 108/147 |
| 5,573,366 | A | | 11/1996 | Meijer | 414/664 |
| 5,578,798 | A | * | 11/1996 | Nuyts | 177/136 |
| 5,606,516 | A | * | 2/1997 | Douglas et al. | 73/1.13 |
| 6,021,722 | A | | 2/2000 | Raycraft | 108/147 |
| 6,029,585 | A | | 2/2000 | Tabayashi | 108/145 |
| 6,062,545 | A | * | 5/2000 | Peavler | 254/418 |
| 6,124,554 | A | | 9/2000 | Muckle et al. | 177/126 |
| 6,464,192 | B1 | * | 10/2002 | Gibbs, Jr. | 248/352 |

* cited by examiner

*Primary Examiner*—Randy W. Gibson
(74) *Attorney, Agent, or Firm*—Crowe & Dunlevy, P.C.

(57) ABSTRACT

The present invention provides a method for lifting and lowering equipment. In a preferred embodiment, the equipment is lifted by attaching a plurality of equipment adapters to the equipment, attaching a jack assembly to each of the plurality of equipment adapters, lifting the equipment by simultaneously raising the jack assemblies, moving the transport under the equipment and lowering the equipment onto the transport. The inventive method may be modified to include an additional process of weighing the equipment before lowering the equipment by measuring the amount of force required to hold the equipment in an elevated position. To practice the inventive method, the present invention also provides an apparatus that includes a plurality of equipment adapters and a plurality of jack assemblies, wherein each of the plurality of jack adapter assemblies is configured for removable connection to a corresponding equipment adapter.

28 Claims, 6 Drawing Sheets

METHOD AND APPARATUS FOR LOADING AND UNLOADING EQUIPMENT

RELATED APPLICATIONS

This application claims priority to Provisional Patent Application No. 60/265,254 filed Jan. 31, 2001.

FIELD OF THE INVENTION

The present invention provides a method and apparatus for raising and lowering equipment to and from a transport vehicle. The present invention optionally provides a method of weighing the equipment during the raising or lowering operation.

BACKGROUND OF THE INVENTION

For many years, skids have been used as mounts for a variety of industrial devices, such as, for example, natural gas compressors, packaged natural gas processing plants and generator packages. Typically, the device is mounted on the skid at the manufacturing facility. Because skids often bear devices that must be positioned at remote locations, skids are designed for durability and portability.

The combined weight of the skid and device requires special handling while loading, transporting and unloading the skid. In the past, a crane or other hoist machine was used to load the skid onto a suitable transport for cartage to the remote destination. Once at the destination, the skid and accompanying device are unloaded from the transport onto a suitable pad or platform through use of a crane. Once the skid has been placed on the pad, the crane and transport are removed from the site. Over the life of the device, the skid and device may be moved several times to various remote locations.

Although effective, the conventional method for loading, transporting and unloading the skid suffers several drawbacks. The use of a crane during the loading and unloading of the skid requires that the crane accompany the transport to the remote location. Over the life of the device, it becomes cost prohibitive to employ a crane each time the skid is moved to a new location. Additionally, prior art methods for handling skids have made it difficult or impossible to accurately weigh the skid during the loading or unloading process. Because cargo weight is a crucial factor to be considered during transportation, especially in marine applications, the weight of the skid must be accurately determined.

In light of the foregoing deficiencies in the prior art, there exists a pressing need to develop an efficient and cost-effective means for loading, transporting, unloading and determining the weight of a skid-mounted device.

SUMMARY OF THE INVENTION

The present invention provides a method for lifting and lowering equipment. In a preferred embodiment, the equipment is lifted by attaching a plurality of equipment adapters to the equipment, attaching a jack assembly to each of the plurality of equipment adapters, lifting the equipment by simultaneously raising the jack assemblies, moving the transport under the equipment and lowering the equipment onto the transport. The inventive method may be optionally modified to include an additional step of weighing the equipment before lowering the equipment by measuring the amount of force required to hold the equipment in an elevated position.

To practice the inventive method, the present invention also provides an apparatus that includes a plurality of equipment adapters and a plurality of jack assemblies, wherein each of the plurality of jack assemblies is configured for removable connection to a corresponding equipment adapter.

DETAILED DESCRIPTION OF THE PREFERRED EMBODIMENT

Because the present invention may be practiced in multiple ways, it is necessary to use certain terms to define multiple embodiments. For example, as used herein, the term "device" will be used to denote machinery or objects that are independent from a skid. The term "equipment" will be used to broadly define a skid, a device or the combination of a skid-mounted device. Furthermore, unless otherwise noted, all components disclosed herein are preferably fabricated from a deformation resistant material, such as steel or other suitable metal.

Figure 1:
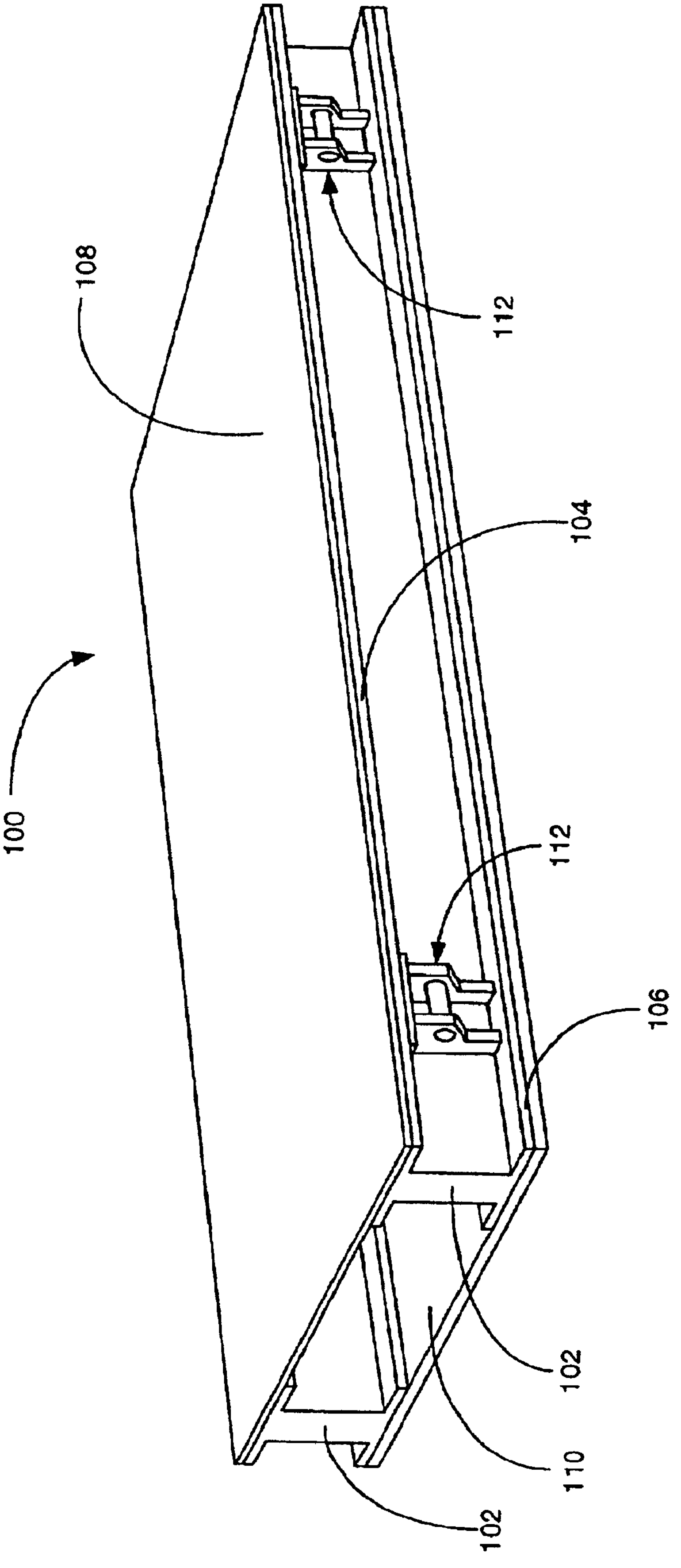
FIG. 1 is a top perspective view of a skid and equipment adapters constructed in accordance with the present invention.

Referring now to FIG. 1, shown therein is a top perspective view of a skid 100 constructed in accordance with a preferred embodiment of the present invention. Although a variety of skids may be successfully used with the present invention, for purposes of the present disclosure the skid 100 is shown having a structural framework that includes a plurality of I-beams 102. Typically, the I-beams 102 are longitudinally oriented about the periphery of the skid 100. The I-beams 102 include an upper flange 104 and a lower flange 106 that extend longitudinally along the length of the I-beams 102. The I-beams 102 support an upper surface 108 and rest upon a lower surface 110.

A plurality of equipment adapters 112 are rigidly affixed between the upper flange 104 and lower flange 106 at specified distances along the length of the I-beams 102. Although two equipment adapters 112 are shown along the I-beams 102, it will be understood by those skilled in the art that, in certain applications of the present invention, additional or fewer equipment adapters 112 may be provided on the skid 100.

Figure 3:
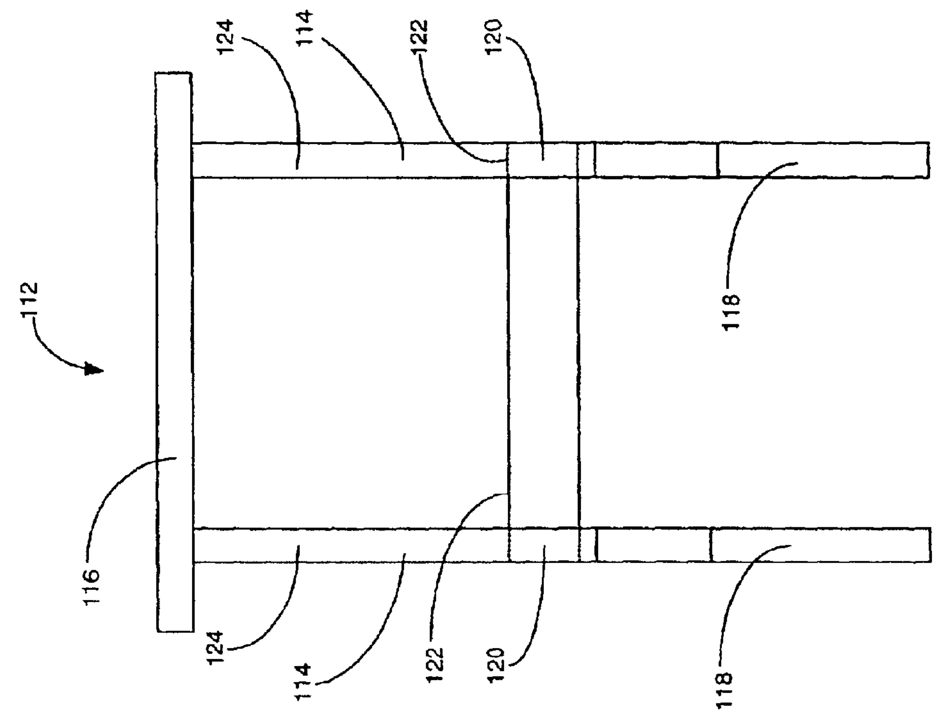
FIG. 3 is a front elevational view of the equipment adapter of FIG. 2.
Figure 2:
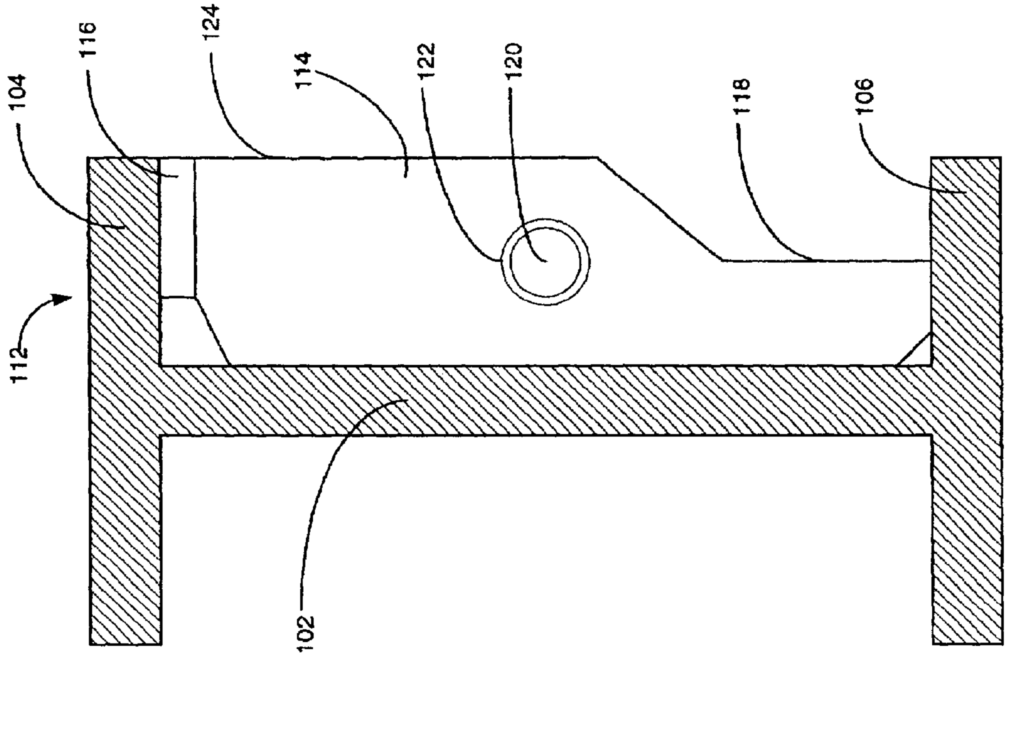
FIG. 2 is a side elevational view of the equipment adapter and I-beam constructed in accordance with a preferred embodiment of the present invention.

With continued reference to FIG. 1 but now also referring to FIGS. 2 and 3, shown therein are side and front elevational views, respectively, of the equipment adapter 112 constructed in accordance with a preferred embodiment of the present invention. In FIG. 2, the equipment adapter 112 is shown connected to an I-beam 102. The I-beam 102 is not shown in FIG. 3.

The equipment adapter 112 includes two vertical members 114 that are maintained in vertical alignment by an upper brace 116. The combined vertical height of the vertical members 114 and upper brace 116 is preferably the same as the vertical distance between the lower flange 106 and the upper flange 104 of the I-beam 102.

The vertical members 114 are substantially rectangular but preferably include an area in relief toward the bottom of each vertical member 114. The outward face of each area in relief forms a lower contact surface 118. A connection pin bore 120 is located in about the center of each vertical member 114. A connection pin guide 122 is located between the vertical members 114 such that the connection pin guide 122 is centered with the connection pin bores 120. Preferably, the connection pin guide 122 has a diameter that is slightly larger than that of the connection pin bore 120. Additionally, each vertical member 114 includes an upper contact surface 124 located above the connection pin bore 120.

Preferably, the equipment adapters 112 are pre-fabricated and installed onto the I-beams 102 of the skid 100 in a retrofit process. Alternatively, the equipment adapters 112 may be constructed as an integrated part during the manufacture of the skid 100. In both cases, it is preferred that the equipment adapters 112 be constructed from a deformation resistant material, such as high strength steel.

It will be noted that the present invention can also be used to move devices that are not supported by a skid or similar platform. In such applications, the equipment adapters 112 can be affixed directly to suitable, load-bearing portions of the device.

Figure 4:
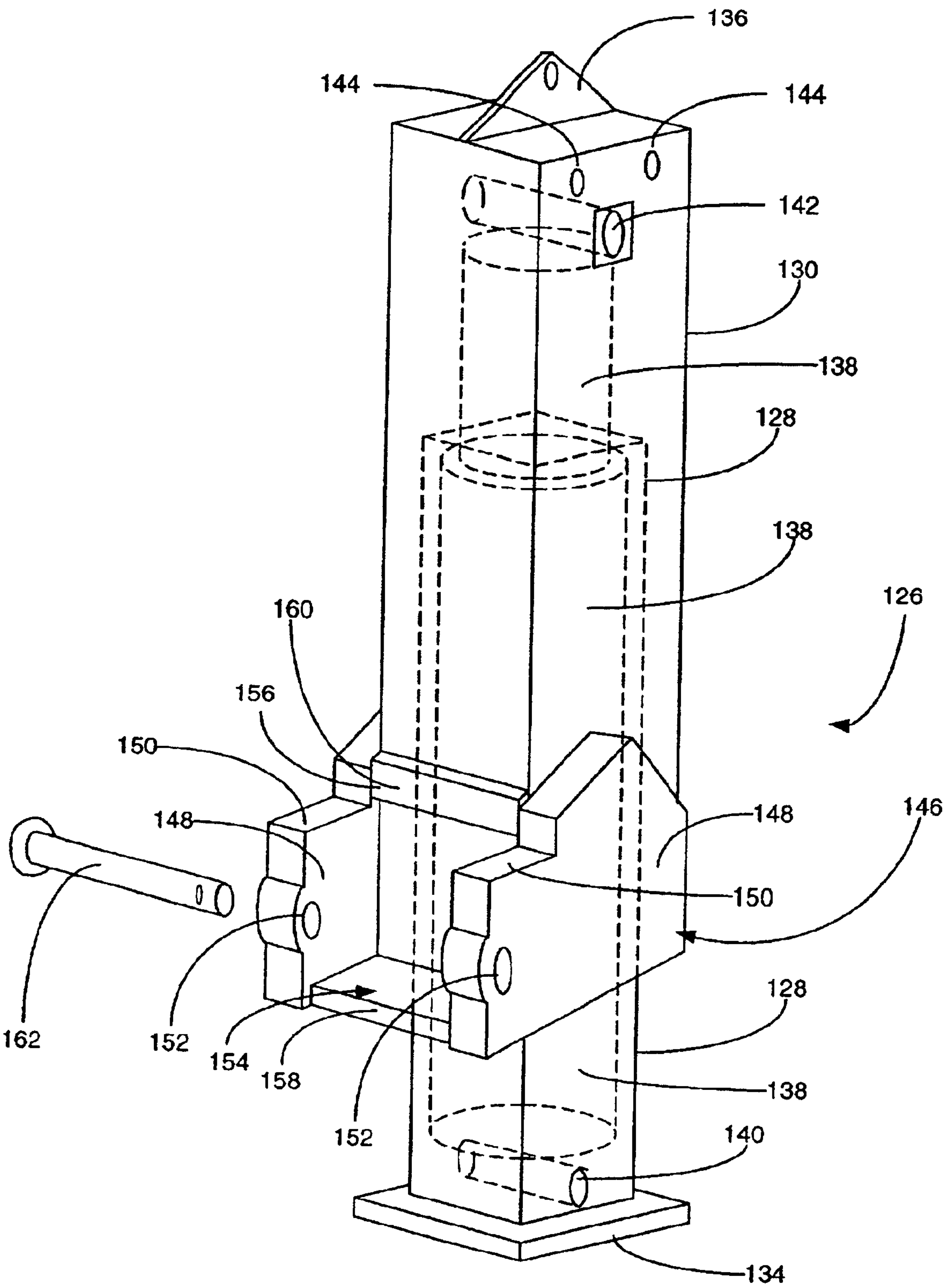
FIG. 4 is a front perspective view of the jack assembly constructed in accordance with the present invention.

Turning now to FIG. 4, shown therein is a front perspective view of a jack assembly 126 constructed in accordance with a preferred embodiment of the present invention. The jack assembly 126 includes a lower cylinder case 128 and an upper cylinder case 130. The lower cylinder case 128 is an open-ended rectangular box that includes four rectangular sides and a rectangular base (not numerically designated). Similarly, the upper cylinder case 130 is an open-ended rectangular box that includes four rectangular sides and a top (not numerically designated).

Figure 5:
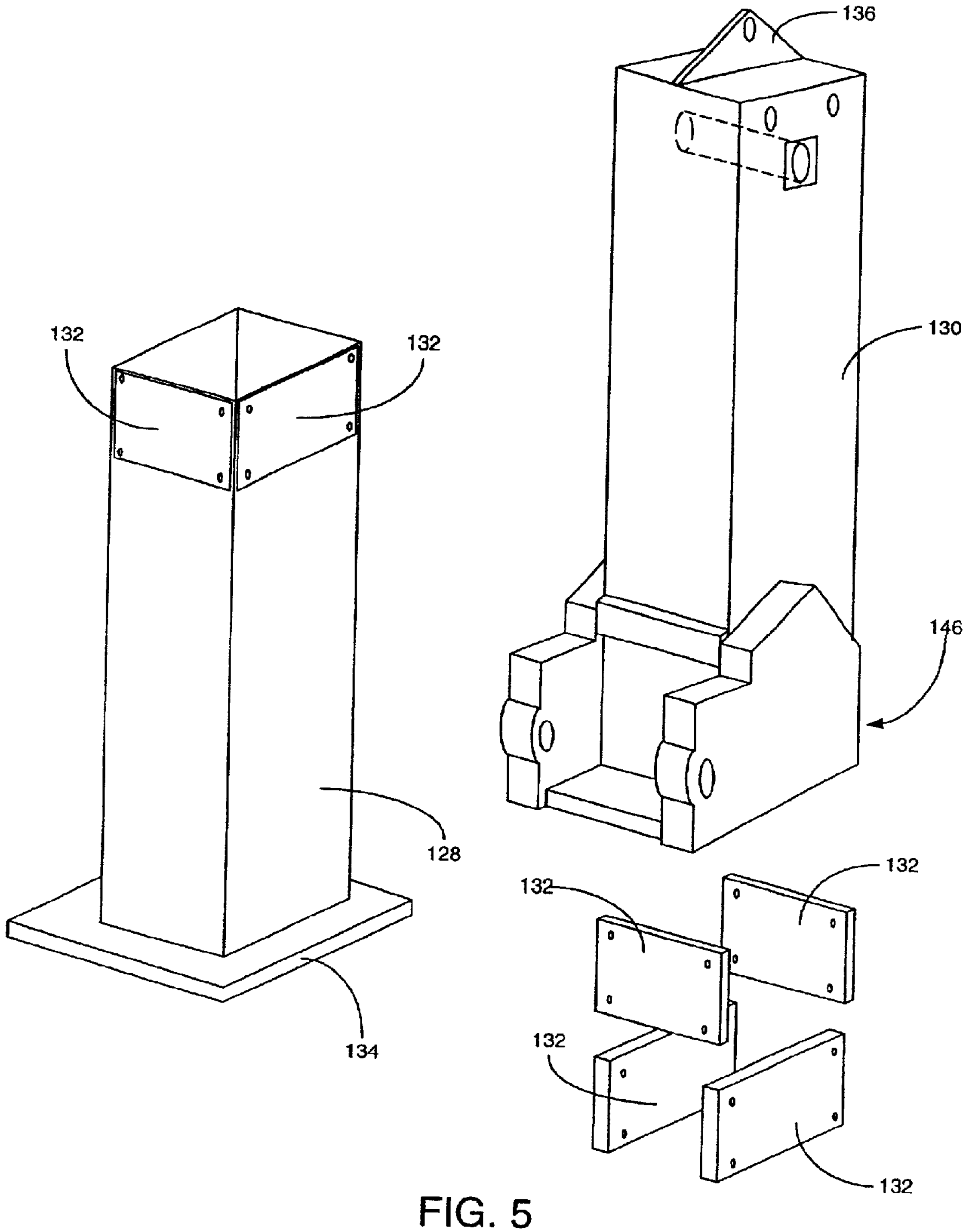
FIG. 5 is a perspective view of the upper and lower cylinder cases of FIG. 4.

With continued reference to FIG. 4 but referring also to FIG. 5, the upper and lower cylinder cases 130, 128 are preferably dimensioned to enable telescopic, sliding engagement with one another. To reduce the amount of friction between the upper cylinder case 130 and lower cylinder cases 128, a plurality of oil impregnated bearings 132 are preferably included on the outer surfaces of the lower cylinder case 128 and along the inner surfaces of the upper cylinder case 130. Preferably the bearings 132 are fabricated from a durable polymer, such as nylon, that absorbs and retains the applied lubricant. It is also preferred that the tolerances between the lower cylinder case 128 and the upper cylinder case 130 substantially eliminate all non-vertical movement between the two cases, thereby minimizing the application of sheer stress on components internal to the cylinder cases.

A jack base 134 is located at the bottom of the lower cylinder case 128 and provides stable footing for the jack assembly 126. A handle 136 is provided on the top of the upper cylinder case 130 and is used to lift and position the jack assembly 126 for attachment to the equipment adapter 112. The handle 136 can also used while moving the jack assembly 126 when not in use.

A hydraulic cylinder 138 is contained within the upper and lower cylinder cases 130, 128. At its terminal ends, the hydraulic cylinder 138 abuts a lower cylinder stop 140 and an upper cylinder stop 142. Preferably, the hydraulic cylinder 138 fits closely within the upper and lower cylinder cases 128, 130, thereby limiting the presence of extraneous lateral movement. Hydraulic connectors 144 located on the upper cylinder case 130 provide fluid communication between the hydraulic generator (not shown) and the hydraulic cylinder 138. Preferably, the hydraulic cylinder is "rifle-bored" to minimize the amount of hydraulic plumbing contained within the lower and upper cylinder cases 128, 130.

A jack adapter assembly 146 is secured to the bottom of the upper cylinder case 130 and includes two side portions 148 that are rigidly affixed to opposing sides of the upper cylinder case 130 through a suitable method, such as welding. Each side portion 148 includes a load bearing surface 150 and a connection pin bore 152. A lower jack adapter brace 154 and an upper jack adapter brace 156 are positioned between the side portions 148 at the bottom and top of the jack adapter assembly 146, respectively. The outer edge of the lower jack adapter brace 154 forms a lower jack adapter contact surface 158. The outer face of the upper jack adapter brace 156 forms an upper jack adapter contact surface 160.

The jack adapter assembly 146 is designed to engage the equipment adapter 112. When engaged, the connection pin bore 120 should align with the connection pin bore 152 to enable passage of a connection pin 162. During engagement, the lower jack adapter contact surface 158 meets the lower contact faces 118. Similarly, the upper jack adapter contact surface 160 meets the outward edge of the upper flange 104 of the I-beam 102. The combined engagement of these contact surfaces assures that the jack assembly 126 maintains a perpendicular relationship with the skid 100 during operation.

It should be noted that, when properly engaged, the exertion of vertical and horizontal forces about the connection pin 162 should be minimal. Ideally, the totality of the vertical force exerted by the jack adapter assembly 112 on the skid 100 is borne by the load bearing surfaces 150. Horizontal forces resulting from the moment created by the application of vertical forces about the jack adapter assembly 146 will be primarily opposed by the upper and lower jack adapter contact surfaces 160, 158, respectively.

Figure 6:
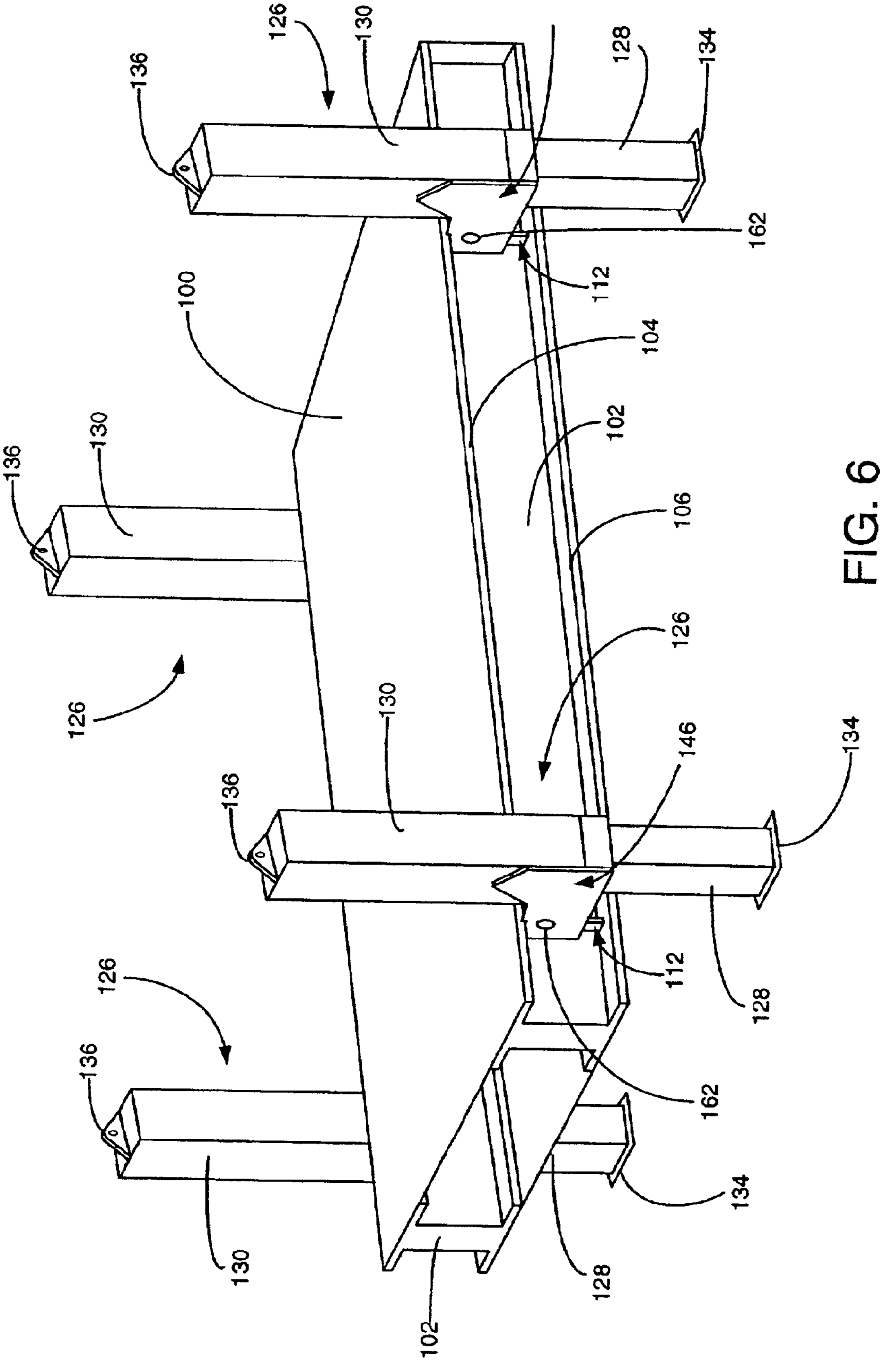
FIG. 6 is a top perspective view of a skid and attached jack assemblies constructed and operated in accordance with a presently preferred embodiment of the present invention.

Turning now to FIG. 6, shown therein is a perspective view of the skid 100 with four attached jack assemblies 126 in a partially raised (or lowered) position. It should be noted that, although four jack assemblies 126 and corresponding equipment adapters 112 are shown, it will be recognized, that additional or fewer jack assemblies 126 and equipment adapters 112 can also be used.

Figure 8:
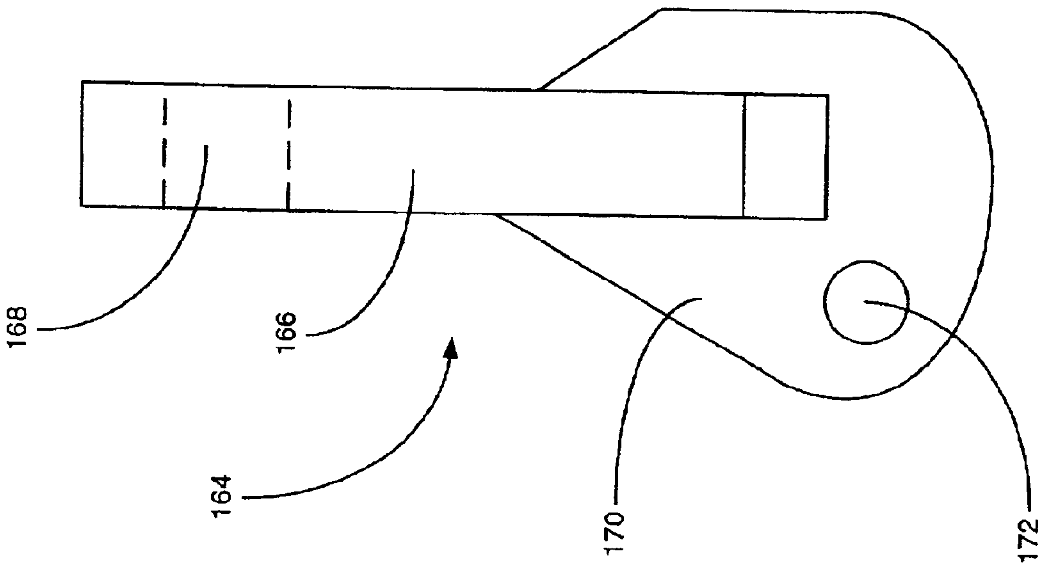
FIG. 8 is a side elevational view of a shackle assembly constructed in accordance with a preferred embodiment of the present invention.
Figure 7:
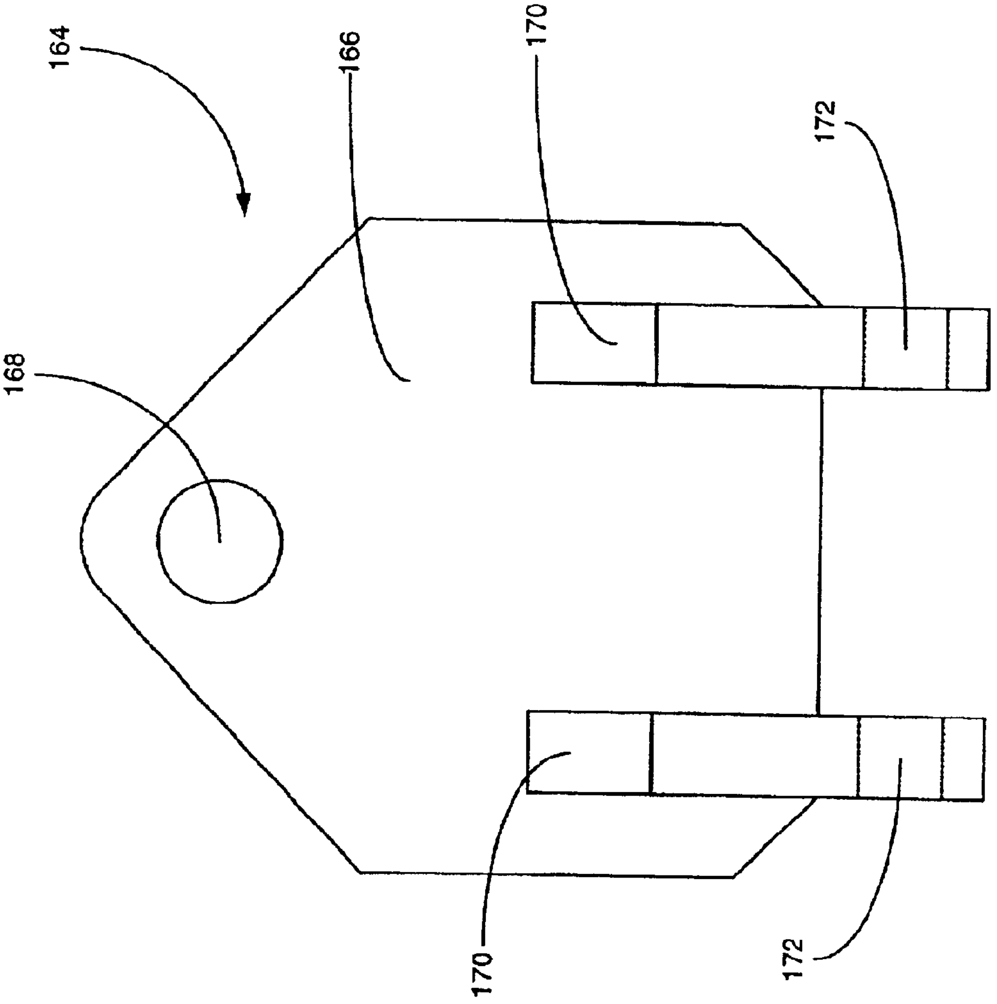
FIG. 7 is a front elevational view of a shackle assembly constructed in accordance with a preferred embodiment of the present invention.

Turning now to FIGS. 7 and 8, shown therein are a front elevational view and a side elevational view, respectively, of a shackle assembly 164. The shackle assembly 164 is designed to be attached to the equipment adapter 112 and serves to allow the equipment adapter 112 to be used with conventional hoist mechanisms. In some applications, it may be desirable to use shackle assemblies 164 and jack adapter assemblies 146 in combination while moving equipment.

The shackle assembly 164 includes a body portion 166 on which a lifting bore 168 is located. The lifting bore 168 is useable to connect the shackle assembly 164 with a crane or other hoist machine (not shown). Also included in the shackle assembly 164 are two attachment flanges 170. The attachment flanges 170 should fit tightly around the outside of the two vertical members 114 of the equipment adapter 112. The attachment flanges 170 also include connection pin bores 172 that have a diameter no less than the corresponding connection pin bores 120 of the vertical members 114. When aligned, the connection pin 162 should pass completely through the two vertical members 114 and the two attachment flanges 170.

The following text describes a method for practicing the present invention in accordance with a preferred embodiment of the present invention. If the equipment was not manufactured with equipment adapters 112, it is necessary to affix the equipment adapters 112 to the equipment before beginning the lifting operation. If the equipment is a skid, such as skid 100, the equipment adapters 112 are preferably attached to external frame members, such as the I-beams 102. If the equipment is an independent device that is not mounted on a skid, the equipment adapters 112 are preferably attached to a suitable load-bearing member on the device. The equipment adapters 112 are preferably welded to the equipment. It will be noted that, in some cases, it may be desirable to attach the equipment adapters 112 to a device that is mounted on a skid. Such attachment of the equipment adapters 112 is also encompassed within the scope of the present invention.

To begin a lifting operation, the jack assemblies 126 are secured to the equipment through engagement of the equipment adapters 112 and the jack adapter assemblies 146. The jack adapter assemblies 146 are secured to the equipment adapters 112 by inserting the connection pin 162 through the connection pin bores 120 and connection pin guides 122.

When all four jack assemblies 126 have been secured to the equipment, hydraulic lines (not shown) are used to connect a hydraulic generator (not shown) to the hydraulic connectors 144. Once connected, hydraulic pressure is transferred from the hydraulic generator to the hydraulic cylinders 138, thereby increasing the internal pressure of the hydraulic cylinders 138. At such time that the combined upward force generated by the hydraulic cylinders 138 exceeds the weight of the equipment, the hydraulic cylinders 138 will telescopically extend, thereby forcing the upper cylinder cases 130 to rise. As the upper cylinder cases 130 are forced upward, the jack assembly adapters 146 impart the upward force through the load bearing members to the equipment, such as the load bearing surfaces 150 of the skid 100.

To adjust the attitude of the equipment during the lifting process, the hydraulic pressure applied to each jack assembly 126 is individually controlled through use of a plurality of control valves (not shown). If automated level control is desired, a closed-loop feedback control system can be used to adjust the attitude of the skid during operation. Such automated level control systems are generally known in the art and could include, for example, mercury switches or gyroscopic components.

Once the equipment has been raised to a sufficient height, a suitable trailer or other transport (not shown) is positioned beneath the raised equipment. Next, the equipment is slowly lowered onto the transport surface (not shown) by gradually reducing the hydraulic pressure in each hydraulic cylinder 138. During the lowering process, the attitude of the equipment is controlled through use of the control valves (not shown). After transport, the aforementioned process is repeated to lower the equipment onto a suitable pad. In certain applications, it may be desirable to disconnect the jack assemblies 126 from the equipment after loading the equipment on the transport. In other applications, the jack assemblies 126 can be maintained in connection with the equipment during transportation.

It may be desirable to use a hoist or crane to lift the equipment either alone or in combination with the jack assemblies 126. If so, the shackle assembly 164 is attached to the equipment adapter 112 by inserting the connection pin 162 through the two vertical members 114 and the two attachment flanges 170. A suitable hoist or crane is then connected to the lifting bore 168 and an upward vertical force is applied to the equipment.

The loading and unloading procedures described above can also be used to determine the weight of the equipment. When the hydraulic jack assemblies 126 are static and under load, the hydraulic cylinders 138 become load cells under a relatively constant pressure. The weight of the equipment can be determined by measuring and summing the force exerted by each cylinder 138 that supports the equipment. The force exerted by the each cylinder 138 is calculated by multiplying the pressure in each hydraulic cylinder 138 by the cross-sectional area of each cylinder 138.

The basic weight equation can be expressed as follows:

$$W=(\Sigma_{i=1}{}^{n}P_i\cdot A)\cdot c \tag{1}$$

where P represents the pressure in each cylinder, A represents the area of each hydraulic cylinder and c is a unitless correction factor that accounts for inefficiencies in the system.

As shown in equation (1), the force exerted by each static hydraulic cylinder is summed together for all cylinders (n). The pressure (P) in each cylinder is determined by attaching conventional, liquid filled pressure gauges to gauge ports located immediately out of each cylinder's pressure ports. The area (A) of each hydraulic cylinder 138 is measured during manufacture.

The correction factor (c) is determined through a conventional calibration routine using a test skid (not shown) and a suitable scale. The jack assemblies 126 are attached to the test skid and the test skid is raised to a specified height. Once the test skid reaches the specified height, the hydraulic cylinders 138 are held static and a pressure reading is taken from each hydraulic cylinder 138. Ideally, the pressure readings from each hydraulic cylinders 138 should be the same. However, an offset in the center of gravity for the test skid could cause an unequal distribution of weight across the skid.

Once the total force exerted by all of the hydraulic cylinders 138 has been determined, the correction factor c can be calculated as the quotient of the known weight of the test skid to the total force exerted by the hydraulic cylinders 138. To ensure the accurate determination of the correction factor c, the above stated calibration routine is preferably repeated over a broad range of skid loads by adding test weights of known mass to the test skid.

It is clear that the present invention is well adapted to carry out its objectives and attain the ends and advantages mentioned above. While presently preferred embodiments of the invention have been described in varying detail for the purposes of this disclosure, it will be understood that numerous changes may be made which will readily suggest themselves to those skilled in the art and which are encompassed within the spirit of the invention disclosed and as defined in the above text and in the accompanying drawings.

It is claimed:

1. A method for loading equipment onto a transport comprising the following steps:

attaching a plurality of equipment adapters to the equipment;

attaching a jack adapter assembly to each equipment adapter, wherein upper and lower contact surfaces on each equipment adapter abut corresponding upper and lower contact surfaces on each jack adapter assembly to restrict lateral movement during the equipment loading operation;

lifting the equipment by simultaneously raising each of the jack adapter assemblies with a separate jack assembly, wherein the weight of the equipment is directly supported by a load bearing surface on each jack adapter assembly due to said load bearing surface lying at least partially under an edge of said equipment while in use;

moving the transport under the equipment; and lowering the equipment onto the transport.

2. The method of claim 1, wherein the step of lifting the equipment by simultaneously raising the jack assemblies is accomplished by applying hydraulic fluid under pressure to the jack assemblies.

3. The method of claim 1 wherein the equipment is a skid and the plurality of equipment adapters are mounted to the skid.

4. The method of claim 1, wherein the equipment is a device that includes load bearing members, and wherein the plurality of equipment adapters are mounted to load-bearing members.

5. The method of claim 1, wherein each jack adapter assembly is attached to each equipment adapter of the plurality of equipment adapters by inserting a connecting pin through a connecting pin bore and a connecting pin guide.

6. The method of claim 1, further comprising a step of weighing the equipment before lowering the equipment onto the transport by holding the equipment at a selected height and measuring the amount of force applied by the jack assemblies.

7. The method of claim 6, wherein the weight of the equipment is measured using the following formula:

$$W=(\Sigma_{i=1}^{n}P_i{\cdot}A){\cdot}c,$$

where W is the weight of the equipment, where n is the total number of cylinders, P is the amount of pressure applied by a single hydraulic cylinder, A is the area of the hydraulic cylinder and c is a correction factor.

8. The method of claim 7, wherein the correction factor c is determined through the following calibration routine:

attaching the equipment adapters to a test skid;

obtaining a known weight of the test skid using a suitable scale;

attaching the jack assemblies to the equipment adapters;

lifting the test skid with the jack assemblies;

calculating the total force applied by the jack assemblies; and determining the correction factor c as the quotient of the known weight of the test skid to the total force applied by the jack assemblies.

9. The method of claim 8, wherein the calibration routine is repeated while varying the weight of the test skid.

10. The method of claim 1, wherein the method further comprises a step of automatically adjusting the attitude of the equipment.

11. An apparatus for loading and unloading a device that is supported by a skid, the apparatus comprising:

a plurality of equipment adapters that are rigidly affixed to the skid, wherein each equipment adapter of the plurality of equipment adapters has an upper contact surface and a lower contact surface;

a plurality of jack assemblies, wherein each jack assembly of the plurality of jack assemblies comprises a jack adapter assembly, and wherein each jack adapter assembly has an upper contact surface, a lower contact surface and a load bearing surface;

wherein each jack adapter assembly is configured for removable connection to a corresponding equipment adapter of the plurality of equipment adapters such that the upper and lower contact surfaces of each jack adapter assembly are placed in contact with the upper and lower contact surfaces of the corresponding equipment adapter to limit lateral movement between each jack adapter assembly and equipment adapter; and wherein the load bearing surfaces of each jack adapter assembly lie at least partially under an edge of said equipment while in use to directly support vertical forces exerted by the skid.

12. The apparatus of claim 11, wherein each jack adapter assembly is retained in connection with the corresponding equipment adapter through insertion of a connecting pin.

13. The apparatus of claim 11, wherein the apparatus further comprises an automated attitude adjustment system.

14. The apparatus of claim 11, wherein each jack assembly of the plurality of jack assemblies further comprises a hydraulic cylinder and a plurality of cylinder cases that are configured for sliding engagement.

15. The apparatus of claim 14, wherein each jack assembly of the plurality of jack assemblies further comprises a plurality of bearings that reduce the amount of friction between the plurality of cylinder cases.

16. The apparatus of claim 15, wherein each bearing of the plurality of bearings is constructed from an oil impregnated plastic.

17. The apparatus of claim 11, wherein the apparatus further comprises a plurality of shackle assemblies and wherein each shackle assembly of the plurality of shackle assemblies is configured for connection to a corresponding equipment adapter of the plurality of equipment adapters and wherein the shackle assemblies are configured for attachment to a crane.

18. A method for measuring the weight and center of gravity of equipment while loading the equipment onto a transport comprising the following steps:

attaching a plurality of equipment adapters to the equipment;

attaching a jack assembly to each equipment adapter of the plurality of equipment adapters;

lifting the equipment by simultaneously raising the jack assemblies;

weighing the equipment before lowering the equipment onto the transport by holding the equipment at a selected height and measuring the amount of force applied by the jack assemblies;

determining the center of gravity of the equipment by independently evaluating the amount of force applied by each of the jack assemblies;

moving the transport under the equipment; and lowering the equipment onto the transport.

19. The method of claim 18, wherein the weight of the skid is measured using the following formula:

$$W=(\Sigma_{i=1}^{n}P_i{\cdot}A){\cdot}c,$$

where W is the weight of the equipment, n is the total number of cylinders, P is the amount of pressure applied by a single hydraulic cylinder, A is the area of the hydraulic cylinder and c is a correction factor.

20. The method of claim 19, wherein the correction factor c is determined through the following calibration routine:

attaching the equipment adapters to a test skid;

obtaining a known weight of the test skid using a suitable scale;

attaching the jack assemblies to the equipment adapters;

lifting the test skid with the jack assemblies;

calculating the total force applied by the jack assemblies; and determining the correction factor c as the quotient of the known weight of the skid to the total force applied by the jack assemblies.

21. The method of claim 20, wherein the calibration routine is repeated while varying the weight of the test skid.

22. An apparatus for loading and unloading equipment, the apparatus comprising:

a plurality of equipment adapters that are rigidly affixed to the equipment, wherein each equipment adapter of the plurality of equipment adapters has an upper contact surface and a lower contact surface;

a plurality of jack assemblies, wherein each jack assembly of the plurality of jack assemblies comprises a jack adapter assembly that has an upper contact surface, a lower contact surface and a load bearing surface; and wherein each jack adapter assembly is configured for removable connection to a corresponding equipment adapter of the plurality of equipment adapters such that the upper and lower contact surfaces of each jack adapter assembly are placed in contact with the upper and lower contact surfaces of the corresponding equipment adapter to limit lateral movement between each jack adapter assembly and equipment adapter; and wherein the load bearing surfaces of each jack adapter assembly lie at least partially under an edge of said equipment while in use to directly support the vertical forces exerted by the equipment.

23. The apparatus of claim 22, wherein each jack adapter assembly is retained in connection with the corresponding equipment adapter through insertion of a connecting pin.

24. The apparatus of claim 22, wherein the apparatus further comprises an automated attitude adjustment system.

25. The apparatus of claim 22, wherein each jack assembly of the plurality jack assemblies further comprises a hydraulic cylinder and a plurality of cylinder cases that are configured for sliding engagement.

26. The apparatus of claim 25, wherein each jack assembly of the plurality of jack assemblies further comprises a plurality of bearings that reduce the amount of friction between the plurality of cylinder cases.

27. The apparatus of claim 26, wherein each bearing of the plurality of bearings is constructed from an oil impregnated plastic.

28. The apparatus of claim 22, wherein the apparatus further comprises a plurality of shackle assemblies and wherein each shackle assembly of the plurality of shackle assemblies is configured for connection to a corresponding equipment adapter of the plurality of equipment adapters, and wherein the shackle assemblies are configured for attachment to a crane.

* * * * *